Figures 1, 6:
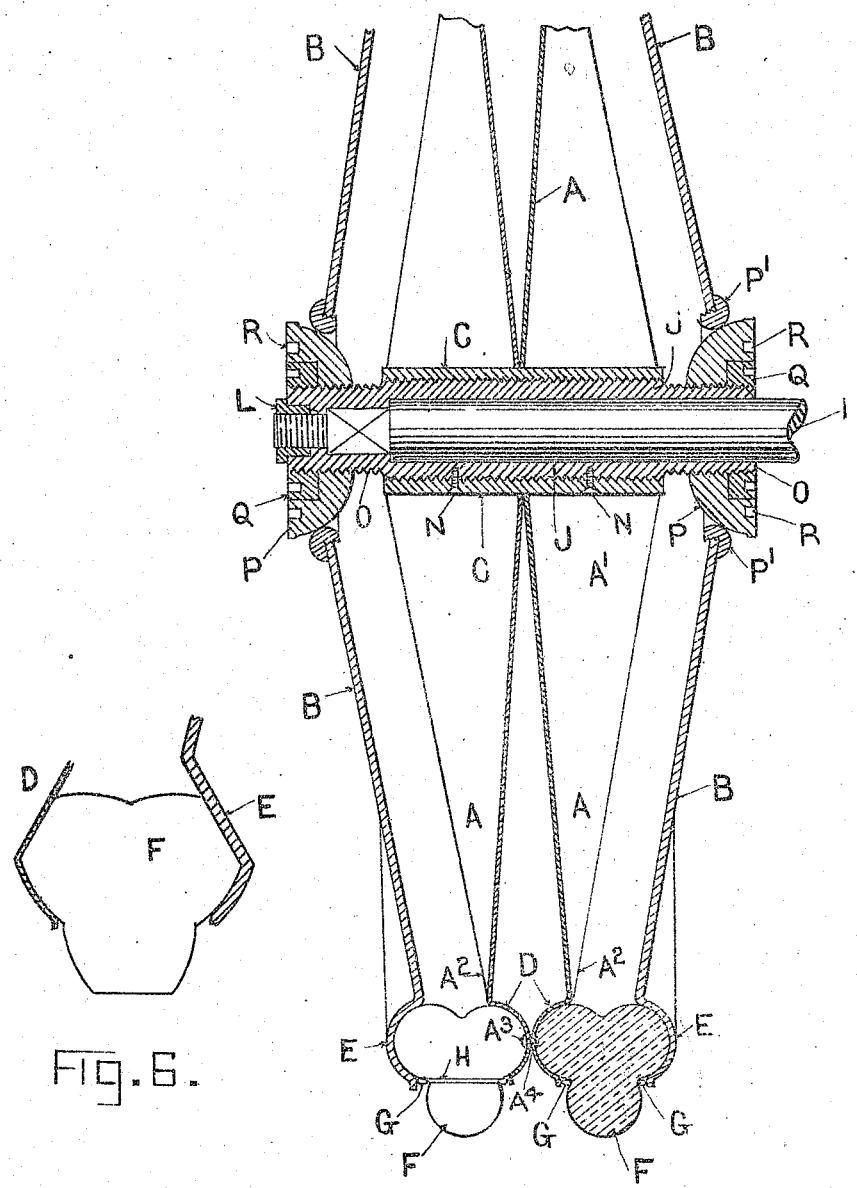

No. 854,914. PATENTED MAY 28, 1907
R. T. SMITH, Jr.
WHEEL FOR VEHICLES.
APPLICATION FILED SEPT. 6, 1906.

3 SHEETS—SHEET 1.

Witnesses
John H. Walker
Harry G. Coventry

Inventor
Robert Thomas Smith Jr.
per Chas Coventry

Attorney

No. 854,914.         PATENTED MAY 28, 1907.
R. T. SMITH, Jr.
WHEEL FOR VEHICLES.
APPLICATION FILED SEPT. 6, 1906.
3 SHEETS—SHEET 2.
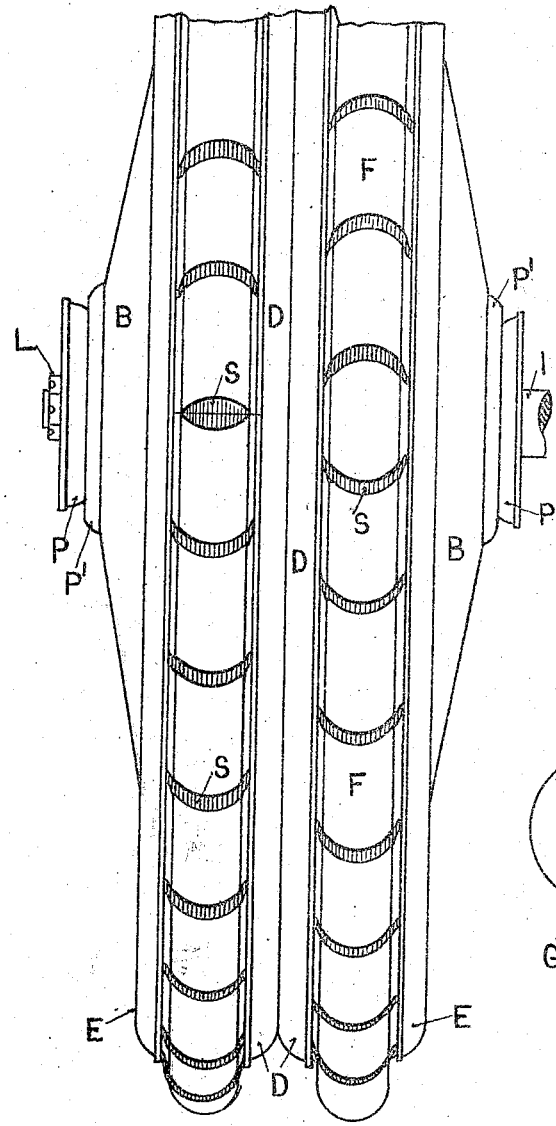
Fig. 2.        Fig. 5.
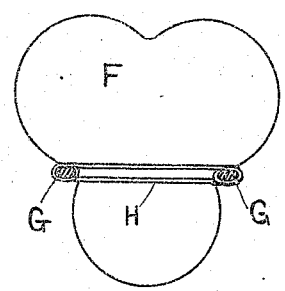
Witnesses
John H. Walker
Harry G. Coventry
Inventor
Robert Thomas Smith
per Chas Coventry
Attorney

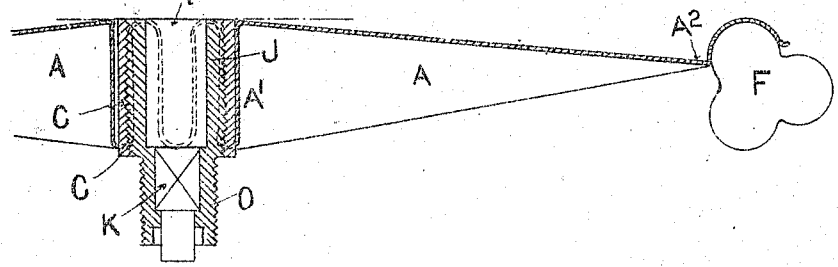
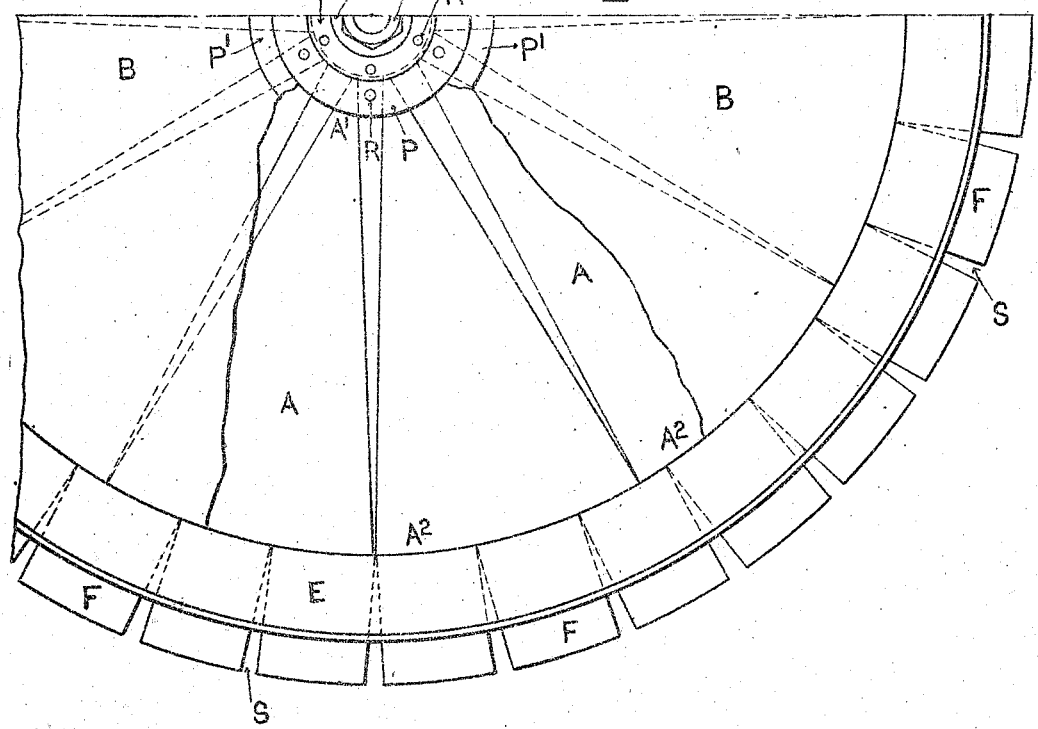

UNITED STATES PATENT OFFICE.

ROBERT THOMAS SMITH, JR., OF WARRINGTON, ENGLAND.

WHEEL FOR VEHICLES.

No. 854,914.        Specification of Letters Patent.        Patented May 28, 1907.

Application filed September 6, 1906. Serial No. 333,488.

*To all whom it may concern:*

Be it known that I, ROBERT THOMAS SMITH, Junior, a subject of the King of Great Britain and Ireland, residing at 111 Lovely Lane, Warrington, in the county Palatine of Lancaster, England, have invented new and useful Improvements in Wheels for Vehicles, of which the following is a specification.

My invention has for its object to produce a tire and wheel for use with motor cars and other vehicles whereby economy of construction, good resiliency, and an advantageous distribution of shock and conservation of energy may be attained and that without liability to puncture; and, in addition to these advantages when my invention is used for vehicle wheels I believe that a deal of trouble will be saved to the users because there will not be so many "spare parts" to carry about.
I will describe the nature of this invention in the first place as applicable to the wheel of a motor car, but I wish it to be understood that the details of my invention may be varied a little. It may also be used for wagons, or when made much lighter for cycles.

In the drawings:—Figure 1 is a section through such parts of a wheel constructed in accordance with my invention as suffice to clearly explain it. Fig. 2 is an end elevation of Fig. 1. Fig. 3 is a side elevation of a portion of Fig. 2, and shows half a wheel. Fig. 4 is a plan view of a portion of Fig. 3. In this figure a portion of the cover plate hereafter described is broken away to allow the interior to be seen. Fig. 5 is an enlarged view of the bottom left hand portion of Fig. 1. Fig. 6 is a similar view to Fig. 5, but showing a modification. Fig. 7 is a detail view of the bottom left hand portion of Fig. 1 showing a modification and Fig. 8 is a sectional plan of Fig. 7 as on the line $x$—$x$.

Referring first more particularly to Figs. 1 to 5. The wheel which has two distinct tires or treads is built up of two internal radially corrugated disks of metal A, and two external annular plates of metal B, the latter of which are preferably dished but plain, that is, not corrugated. Each piece A, is preferably made by pressing or rolling a flat strip which gradually assumes a circular form because the corrugations are deep at one end ($A^1$) and die away to nothing as at $A^2$ near the periphery. The adjacent ends of the annulus thus formed overlap a little and are riveted and brazed together. These two corrugated disks A, are fastened to each other at the hub end by means of a sleeve C, and they are also riveted together and brazed near their peripheries as shown at $A^3$, $A^4$, of Fig. 1.

The peripheral portions of the disks A, are spun, or pressed to form circumferential half rims or channels D, and the opposite parts of the plates B, are correspondingly shaped as shown at E, so that the treads of the wheels may be gripped between the adjacent circumferential channels when the plates B, are screwed toward each other as hereafter described.

The tread or the actual tire of the wheel is made up of a series of blocks F, of rubber or other suitable material. The shape I prefer is that shown in Figs. 1 to 5, that is to say in cross section they show three equidistant ribs the exterior contour of each of which forms a portion of a circle. I may in some cases modify their section a little for instance as shown in Fig. 6.

The blocks F, when first made are not curved but straight so that when they are put in place between the channels D and E, they are curved thereby and their adjacent ends spring apart thus forming a series of wedged shaped orifices S (see Figs. 2 and 3) and these serve to minimize side slip or skidding on the road and they also enhance the resiliency of the tire. The orifices on one side of the wheel alternate with those on the other so as to avoid bump. These blocks F, are retained in place in the metal parts of the wheel partly or entirely by the grip of the embracing channels D, and E, but I prefer as a safeguard to employ circumferential wires G, (see Figs. 1 and 5) to fit in the valleys where the ribs meet, and said wires are preferably connected crosswise by other thinner cross wires H which thus prevent the wires G, of each tread from splaying. These cross wires H fit between the adjacent ends of the blocks of rubber when the parts are assembled.

It should be understood that there are two treads to each wheel.

In practice and as shown one of the ribs on each tread forms the actual tread in use, and the other two of them are gripped by the channels D, E, D, E, as above described but I wish to make it clear that anyone of these salient parts may be used for the tread, the other two for the time being being gripped as above described.

In the example shown in the drawings the wheel and its shaft revolve together and said wheel may be used as a driving wheel. Should it be desired to let the wheel run loose on the shaft the modifications are so obvious and various as to require no explanation to anyone skilled in the art to which my invention appertains.

I is the shaft or axle and J is a bush surrounding it, and said bush is prevented from turning on shaft I by reason of having a squared part K. (see Figs, 1 & 4) and L is a locknut to keep the parts I and J relatively rigid though they might in some cases be made in one piece.

C, is a sleeve screwed on to the bush J, and it is to this sleeve that the bunched ends A¹ of the disks A are affixed, preferably by casting said sleeve on to them after they have been formed.

N are set screws or pins inserted after the sleeve M has been placed in its proper position.

On each end of the sleeve C, is a threaded nose O, and these noses form bolts and serve to carry two bosses or tapered nuts P, P, and it is by the screwing up of these nuts toward each other that the requisite pressure is applied sidewise to hold the parts of the wheel together and to keep the blocks F, in place.

Q, are lock nuts and both these and the bosses or rings P, are preferably provided with holes R, so that they may be turned by a tommy bar or other suitable tool. The object of this construction is to keep the exterior of the wheel as flush as possible.

Surrounding the bosses P, and rigidly attached to the outer plates B, are rings P¹, preferably of very hard steel, so made that the fiber runs circumferentially for the sake of strength. The bosses P, and rings P¹, form a sort of limited ball and socket joint and a very slight relative movement is caused when the tread is compressed and the bottom edges E, of the plates B, are thereby splayed a little apart. At the same time the top parts of the plates B, come together a little, thus distributing the strain.

Referring now more particularly to Figs. 7 and 8. In this modification in addition to the wires G and H above mentioned I provide a circumferential wire T and this is threaded alternately within and without the rim (like plain stitching) there being a cross length bridging a portion of the channel A, between each pair of circumferential lengths. Thus T, shows the circumferential lengths and U the bridging lengths. The wire is threaded through holes V in the rim and alternately through holes W in lugs X punched out of the metal of the rim A. The bridging lengths of wire U fit between the ends of the blocks F, & thus help to retain them in place circumferentially and to prevent them creeping.

It is to be understood that should one face of a block F, get worn or cut it is only necessary to slack away one of the outer plates B, so as to gain access to the interior of the wheel when the damaged block can be removed and turned one third round thus exposing another rib to the outside. In the same way new blocks are readily inserted.

The mode of action is as follows:— Presuming the wheel to be in use on a motor car, when the tread strikes against an obstacle or even in ordinary running on smooth ground the rubber F, is pushed inward and the effect of this is to spread apart (to a greater or lesser degree according to the pressure) the two outer channel shaped portions E, at its lowest part thus bringing together in a gradual manner the upper portions and causing a compression of the rubber all round and distributing the strain and pressure. I find that after compression has taken place the rebound helps to conserve energy which has hitherto in many cases been wasted and that the combination of the rubber tire as above described with the somewhat elastic and springy plates gives advantages not heretofore achieved.

It will be seen that when one of the salient ribs is compressed by the load it tends to splay the two other ribs of the same block and these in turn press against the adjacent block at the other side of the rim so that the pressure which may be extreme at the exact point of the contact of the block with an obstacle (such for instance a stone or a curbstone edge) is immediately taken up and distributed laterally and also longitudinally. The stiff elasticity of the plates A, A, does much to enhance this action.

Should it happen that one tread only (instead of both) is called on to take up the whole load or shock of its wheel I make the parts sufficiently strong to withstand this.

It should be understood as an important feature of my invention that except for the local distortion of the blocks actually in contact with the ground in a vertical direction, that is to say, that part of the distortion that takes place toward the shaft, all the other compression or distortion is lateral and the vertical distance of the shaft from the ground varies very little and is not by any means commensurate with the amount of cushioning effect. This is an advantage because the more nearly the circular shape of the wheel is retained the better.

What I do claim as my invention and desire to secure by Letters Patent is:—

1. In a wheel for vehicles the combination of a pair of radially corrugated plates each having near its periphery a channel to embrace one side of a rubber tire and outer plates having corresponding channels to grip the other sides and means for holding and tightening the parts substantially as described.

2. In a wheel for vehicles the combination with a pair of radially corrugated plates each having near its periphery a channel, and outer plates having corresponding channels, of a tire portion having three ribs or treads, anyone of which may be used as the actual tread interchangeably with the others, substantially as set forth.

3. A wheel for vehicles having two inside corrugated plates, two outer plates and two sets of rubber blocks gripped between them in such manner that the compression of anyone of these blocks vertically compresses the others, substantially as described.

4. In a wheel for vehicles the combination with the corrugated plates A, outer plates B and the rubber tire, of wires G and H, substantially as set forth.

5. The combination with wires G and H, of wires T and U, threaded through holes V in the rim of the wheel and alternately through holes W in lugs thereon, substantially as and for the purposes described.

In testimony whereof I have hereunto signed my name to this specification in the presence of two subscribing witnesses.

ROBERT THOMAS SMITH JUNIOR.

Witnesses:
CHAS. COVENTRY,
J. STEVENS.